Oct. 11, 1938.  S. E. CAMPBELL  2,133,186
PROCESS OF TREATING EMULSIONS
Filed Sept. 16, 1935   2 Sheets-Sheet 1

INVENTOR
Sumner E. Campbell
BY
ATTORNEY.

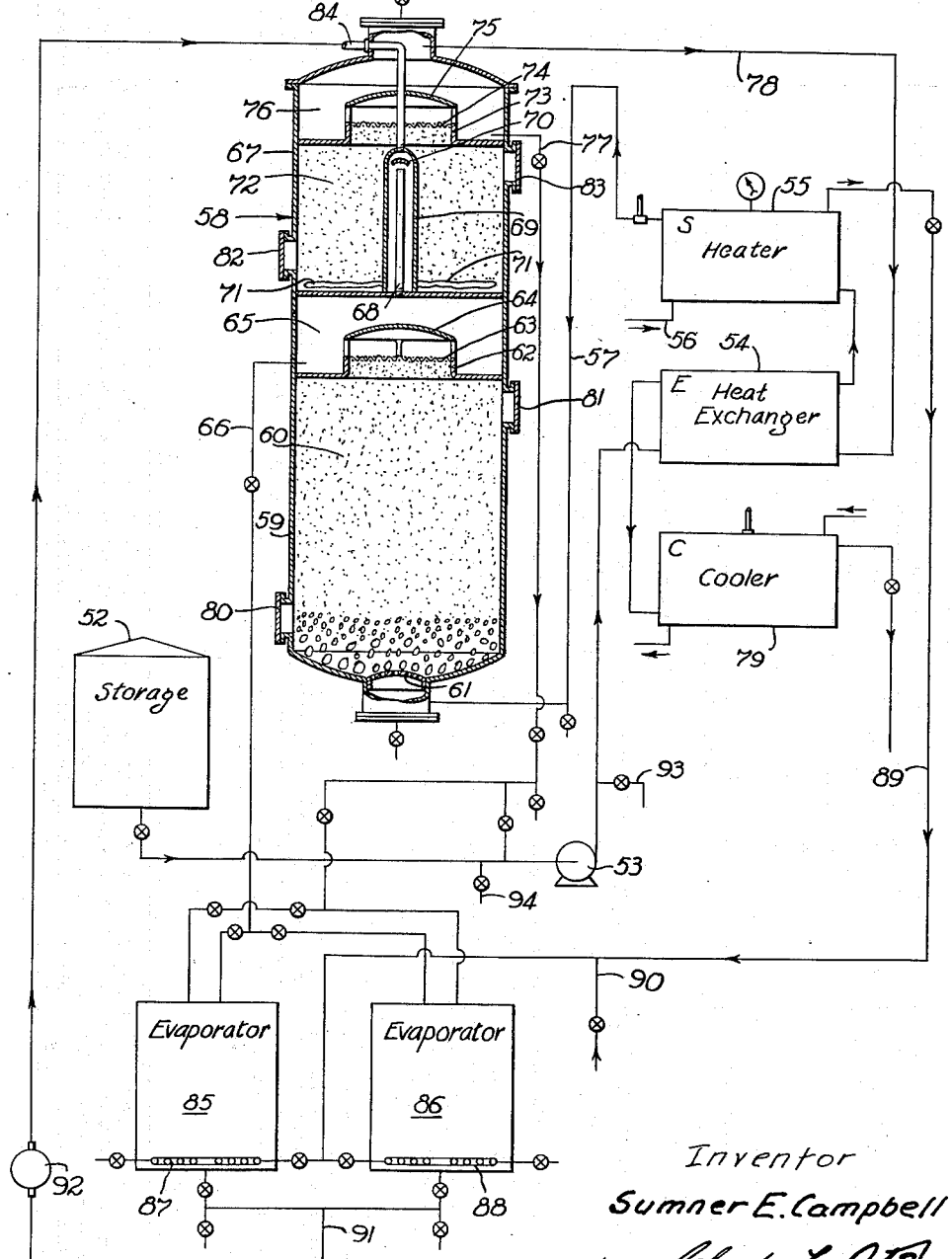

Patented Oct. 11, 1938

2,133,186

UNITED STATES PATENT OFFICE 2,133,186

PROCESS OF TREATING EMULSIONS

Sumner E. Campbell, Long Beach, Calif.

Application September 16, 1935, Serial No. 40,721

5 Claims. (Cl. 196—4)

This invention relates to a process for breaking emulsions and has for its principal object the separation of water from emulsions, such as are known as crude oil emulsions or emulsions resulting in the production of crude oils from the earth, or otherwise.

In dehydrating crude oil, or other oil containing water generally dispersed in large or small particles therein, many methods are in vogue for separating the water successfully and economically, yet such methods often fail to break so-called "tight" emulsions except at a prohibitive cost.

Crude petroleum as normally produced from an oil well is mixed with varying percentages of water, usually saline in character, and the salinity of such associated water varies considerably depending on the locality from which the oil is produced.

For instance, water separated from certain crude oils in the Signal Hill field in California has a salinity of about from three to six percent, and in the present process such oils are heated according to the following disclosure to practically remove substantially all the water from the oil, or at least to remove the water to a degree in which it is practically ready for refining or other purposes.

In the diagrammatic sheets of drawings:

Fig. 4 illustrates a modification.

Figure 1:
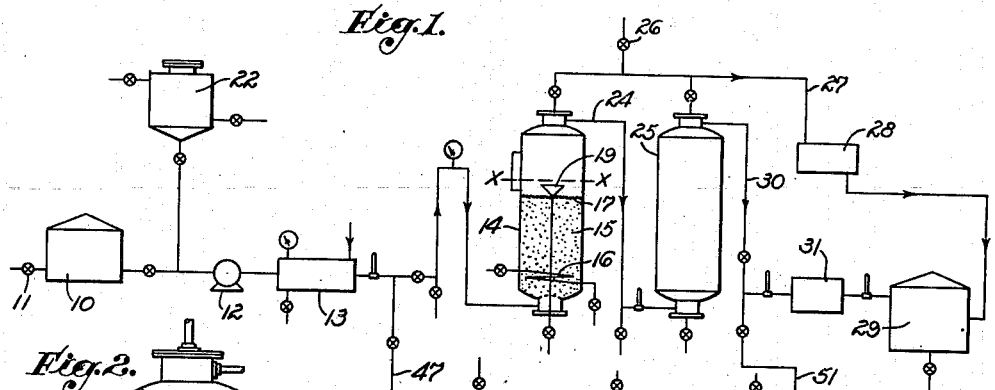
Fig. 1 is a flow sheet illustrating the preferred method of operation.
Figure 2:
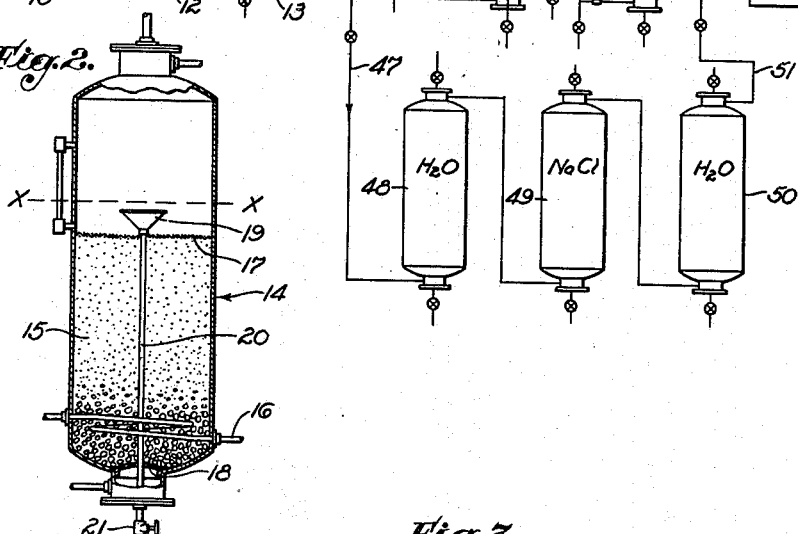
Fig. 2 is a vertical sectional view of a treating tower used in Fig. 1.

The crude oil, or other emulsified oil, may be stored in tank 10 from which large masses of water easily separable by gravity are withdrawn through pipe 11.

The emulsified oil is then drawn off by pump 12 and fed through heater 13, which may be an ordinary heat exchanger heated by steam or a still such as a pipe still or the like in which the temperature of the emulsion is raised to about 200° F. The heated mixture is then passed into the bottom of a tower 14, the height of which is about three to four times its diameter, which is about three-fourths filled with a finely divided inert contact material 15 such as quartz or the like. No. 16 mesh silica will serve the purpose very well.

The tower 14, thus packed with contact material 15, is filled to slightly above the upper surface of the packing material with a salt solution, or brine, of a degree of salinity at least that of the water in the entering emulsion, and the tower 14 and contained contact material and solution are primarily heated to the desired temperature of the emulsion to be treated, say about 200° F. by means of a steam coil 16 before the emulsion is flowed into tower 14.

The emulsified oil at a temperature of about 200° F. is flowed upwardly through the finely divided and heated contact material 15 immersed in brine of a predetermined degree of salinity, said contact material being held firmly in place by a perforated screen, or plate, 17 and on entering the bottom of tower 14 is distributed through a plate 18 and thence through the contact material 15 wherein the normally spherical globules of oil with entrained water are distorted innumerable times in their upward passage through the tower whereby the enveloping emulsifying jacket around the water is ruptured exposing the inner parts of the oil globule to contact with the body of saline water in which the contact material is immersed and coalescence of the water globules with said body of water is accomplished.

The result from this mode of operation is distinct from agglomeration wherein, due to surface tension effects, the particles of water may be built up by accretion on loosely packed and large size contact material particles to a point where they become large enough to separate from the oil by gravity.

At a predetermined level in tower 14 there is arranged an overflow drain for the coalesced water which is illustrated for clarity in the form of a wide mouthed funnel 19 connected with a valved drain pipe 20 passing out of the bottom of tower 14 and a liquid level of coalesced water X—X is maintained which is slightly above the horizontal plane of the upper edge of the funnel 19, the object being to assure withdrawal only of coalesced water through pipe 20.

It is, of course, clear that any other suitable liquid draw-off can be used in place of funnel 19 and that pipe 20 may be equipped with a valve 21, either manually operated or of a well known automatic type to maintain the liquid level X—X.

In some cases only one such tower 14 is required, but a plurality of such towers in series is within the scope of the invention if necessary for any reason.

It is highly desirable to maintain the salinity of the body of water held in tower 14 up to the point of saturation in order to effect the most complete separation of the water from the oil, but the process is efficient in most cases with a salinity of about ten percent (10%).

In such cases where the salinity of the entering water is sufficient to maintain the desired salinity of the body of water in tower 14 that is sufficient, but if the salinity of the entering water decreases below the necessary concentration, a concentrated NaCl, or other equivalent brine, solution is added to the emulsified oil prior to its entry into tower 14 from a brine tank 22.

The process is continuous and the introduction of the salt solution may also be continuous while the pressure may be just sufficient to assure a desired flow rate or may be from 50 to 100 pounds per square inch above atmospheric pressure, which increased pressure aids in breaking the emulsion while preventing excessive volatilization of desired light products at the operating temperatures.

While a temperature of 200° F. is noted as an efficient temperature at substantially atmospheric pressures, it must be understood that the temperature may range from 150° to 350° F., depending on type of emulsion and corresponding pressure used.

The dehydrated oil passes, if necessary, through a second similar contact tower 25 and, when volatile compounds are given off from the towers 14 and 25 at the operating temperatures they may be either vented through a pipe 26 to atmosphere, or used as fuel or for other purposes, or may be passed through line 27 and cooler 28 to a crude oil storage tank 29 to which the dehydrated oil is led from tower 25 through line 30 and cooler 31, the temperature of the gas and oil being reduced in coolers 28 and 31 at least to atmospheric temperature, or to any desired degree.

As an alternative method of maintaining salinity and to minimize the consumption of salt where crude oils of high water content are to be dehydrated, the addition of brine may be stopped from tank 22 and the heated emulsion passes into tower 14, as described, in which a body of contact material and a body of water of any degree of salinity is maintained wherein the bulk of the free water is eliminated.

The oil, still containing finely divided particles of water of a low degree of salinity then passes into similarly constructed tower 25 in which the contact material is salt so that the water dissolves sufficient of the salt to provide a high saline concentration and efficiently separate the remaining water.

Another alternative method is shown in Fig. 1 in which at times the wet oil in storage tank 10 contains a large percentage of water which is below the salinity required for efficient separation and in which case the addition of concentrated brine from tank 22 would be inexpedient.

The procedure in such event is to pass the heated oil through line 47 into a tower 48 (similarly constructed to tower 14) and containing a somewhat concentrated brine solution of about 23% in which the bulk of the water is removed.

The mixing of excess water with the brine in tower 48 so far reduces its salinity that tower 48 becomes relatively inefficient to remove all the water to commercial requirements and therefore the oil containing water of low salinity is passed into a tower 49 which is substantially filled with granulated salt whereby the entering water is brought up to the desired salinity to be passed into tower 50 (similarly constructed and operated to towers 14 and 48) wherein the remaining water is removed.

The dehydrated oil, as before, then passes through line 51 and cooler 31 to storage 29.

As examples of the operation of the process wherein the towers 48, 49 and 50 are used and in which the salinity of the water in towers 48 and 50 was about 23%, the following tabulations taken from test runs are distinctive.

*Example No. 1*

| Time | Temp. in No. 48 | Temp. out No. 48 | Temp. out No. 50 | B. S. and Water in No. 48 | B. S. and Water out No. 48 | B. S. and Water out No. 50 |
|---|---|---|---|---|---|---|
| | °F. | °F. | °F. | Percent | Percent | Percent |
| 3:30 p. m | 200 | 176 | 167 | 3.0 | 0.6 | 0.2 |
| 3:55 p. m | 204 | 181 | 168 | 2.4 | 0.4 | 0.1 |
| 5:00 p. m | 200 | 166 | 162 | 3.4 | 0.3 | 0.1 |
| 6:00 p. m | 198 | 158 | 150 | 2.8 | 0.2 | 0.1 |
| 7:00 p. m | 204 | 165 | 145 | 2.5 | 0.3 | 0.1 |
| 8:00 p. m | 202 | 167 | 138 | 3.2 | 0.3 | 0.1 |
| 9:00 p. m | 202 | 169 | 136 | 2.8 | 0.5 | 0.1 |
| 10:00 p. m | 200 | 179 | 140 | 2.8 | 0.5 | 0.1 |
| 11:00 p. m | 201 | 183 | 143 | 2.8 | 0.4 | 0.1 |
| 12:00 p. m | 202 | 184 | 144 | 2.7 | 1.1 | +0.1 |
| 1:00 a. m | 202 | 187 | 152 | 2.9 | 1.2 | 0.2 |
| 2:00 a. m | 200 | 186 | 154 | 3.4 | 1.4 | +0.1 |
| 3:00 a. m | 200 | 183 | 151 | 2.7 | 1.1 | 0.1 |
| 4:00 a. m | 204 | 184 | 154 | 3.6 | 0.9 | 0.1 |
| 5:00 a. m | 202 | 179 | 153 | 2.0 | 1.0 | 0.2 |
| 6:00 a. m | 198 | 179 | 150 | 1.5 | 1.0 | 0.2 |
| 7:00 a. m | 199 | 176 | 144 | 1.9 | 1.2 | 0.2 |
| 8:00 a. m | 199 | 180 | 148 | 1.6 | 1.4 | −0.2 |
| 9:00 a. m | 205 | 173 | 145 | 4.6 | 1.8 | 0.1 |
| 10:00 a. m | 192 | 183 | 147 | 1.6 | 1.2 | 0.1 |
| 11:00 a. m | 199 | 178 | 144 | 1.2 | 0.8 | −0.1 |
| 12:00 m | 206 | 170 | 140 | 1.8 | 1.4 | −0.1 |
| 1:00 p. m | 200 | 174 | 144 | 1.8 | 1.6 | −0.1 |
| 2:00 p. m | 193 | 182 | 143 | 1.8 | 1.6 | −0.1 |
| 3:00 p. m | 196 | 178 | 143 | 2.0 | 1.5 | −0.1 |
| 4:00 p. m | 200 | 144 | 128 | 12.6 | 0.2 | 0.1 |
| 5:00 p. m | 200 | 144 | 138 | 8.4 | 0.2 | 0.2 |
| 6:00 p. m | 196 | 135 | 134 | 13.0 | 0.3 | 0.1 |
| 7:00 p. m | 200 | 142 | 134 | 9.6 | 0.2 | 0.1 |
| 8:00 p. m | 200 | 160 | 128 | 8.6 | 0.4 | 0.1 |
| 9:00 p. m | 198 | 150 | 114 | 9.2 | 0.3 | 0.1 |
| 10:00 p. m | 200 | 150 | 110 | 12.6 | 0.3 | 0.1 |
| 11:00 p. m | 208 | 153 | 109 | 12.0 | 0.3 | 0.2 |
| 12:00 p. m | 203 | 157 | 110 | 12.2 | 0.4 | 0.1 |
| 1:00 a. m | 198 | 173 | 112 | 12.6 | 0.5 | 0.1 |
| 2:00 a. m | 200 | 175 | 114 | 9.8 | 0.5 | 0.1 |
| 3:00 a. m | 199 | 176 | 116 | 7.8 | 0.5 | 0.1 |

*Example No. 2*

| Time | Temp. in No. 48 | Temp. out No. 48 | Temp. out No. 50 | B. S. and Water in No. 48 | B. S. and Water out No. 48 | B. S. and Water out No. 50 |
|---|---|---|---|---|---|---|
| 4:00 a. m | 202 | 175 | 122 | 56.0 | 0.5 | 0.1 |
| 5:00 a. m | 197 | 174 | 126 | 38.0 | 0.9 | 0.1 |

*Example No. 3*

| Time | Temp. in No. 48 | Temp. out No. 48 | Temp. out No. 50 | B. S. and Water in No. 48 | B. S. and Water out No. 48 | B. S. and Water out No. 50 |
|---|---|---|---|---|---|---|
| 12:00 p. m | 200 | 144 | 128 | 12.6 | 0.2 | 0.1 |
| 1:00 a. m | 200 | 144 | 138 | 8.4 | 0.2 | 0.2 |
| 2:00 a. m | 196 | 135 | 134 | 13.0 | 0.3 | 0.1 |
| 3:00 a. m | 200 | 142 | 134 | 9.6 | 0.2 | 0.1 |
| 4:00 a. m | 200 | 160 | 128 | 8.6 | 0.4 | 0.1 |
| 5:00 a. m | 198 | 150 | 114 | 9.2 | 0.3 | 0.1 |
| 6:00 a. m | 200 | 150 | 110 | 12.6 | 0.3 | 0.1 |
| 7:00 a. m | 208 | 153 | 109 | 12.0 | 0.3 | 0.2 |
| 8:00 a. m | 203 | 157 | 110 | 12.2 | 0.4 | 0.1 |
| 9:00 a. m | 198 | 173 | 112 | 12.6 | 0.5 | 0.1 |
| 10:00 a. m | 200 | 175 | 114 | 9.8 | 0.5 | 0.1 |
| 11:00 a. m | 199 | 176 | 116 | 7.8 | 0.5 | 0.1 |

Example No. 1 is a mixture of crudes which had already been treated with chemical dehydrating agents which had failed to reduce the water content to the required commercial limit for pipe line oil which is from 1 to 3%.

Figure 3:
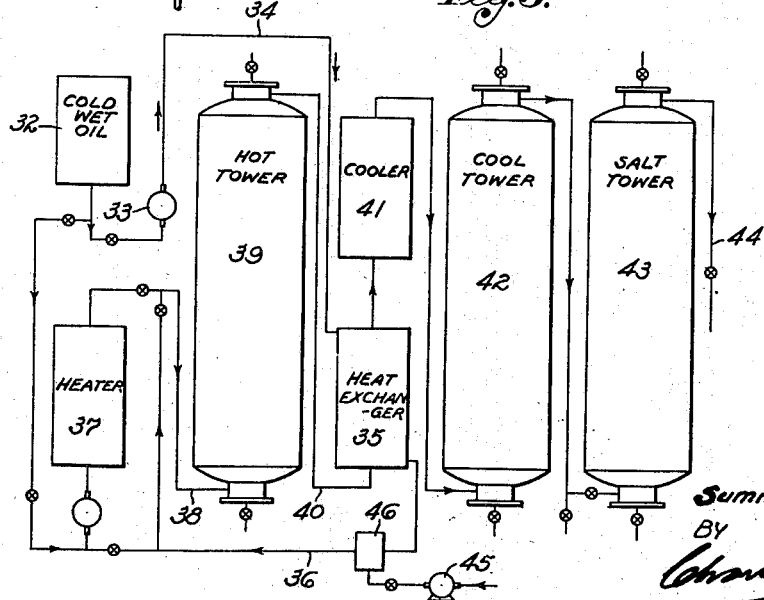
Fig. 3 is a flow sheet showing a modification of Fig. 1.

A modification is shown in Fig. 3 in which the emulsified cold oil is passed from storage 32 by pump 33 and line 34 through heat exchanger 35 in which its temperature is somewhat raised and then through line 36 and heater 37 wherein its temperature is brought to the desired point, as before described, of the order of 200° F.

The thus heated emulsion then flows under the required applied pressure, superatmospheric or otherwise, through line 38 to the bottom of tower 39, which is similarly constructed to tower 14 before described, and upwardly through the contact material therein.

At the temperatures employed under these conditions, some of the water is carried with the oil stream in the form of a fog so that complete separation in one tower is not possible.

If, now, such heated emulsified oil is run through a system such as shown in Fig. 3, this difficulty of complete separation of the oil and water is overcome.

More specifically, this is accomplished by first passing emulsified oil, crude or otherwise, while heated to a desired temperature through a first contact section wherein the bulk of the water is separated and is then cooled to at least atmospheric temperature prior to passage through a second contact section whereby the moisture in the form of a fog is first reduced by cooling to minute particles of water which are coalesced and separated in the second or succeeding contact sections. A further advantage accrues from this mode of operation by conservation of valuable light constituents of the oil which otherwise may be lost by evaporation if carried over with hot oil.

The thus heated oil is passed into the bottom of tower 39, which is preferably insulated and contains contact material substantially immersed in a maintained body of the heavier liquid to be removed. In tower 39 at relatively high temperature and relatively low velocity, the bulk of the water is separated and removed from the oil, which then passes through heat exchanger 35 wherein it gives up a large percentage of its applied heat to the cold wet oil and flows through a cooler 41 wherein its temperature is reduced to atmospheric temperature, or any desired lower temperature above the freezing point of water.

The thus cooled oil, which will then contain the aforesaid fog in the form of minute particles of water, passes upwardly through a second similar contact tower 42 containing contact material similarly immersed in a body of the heavier liquid to be removed wherein said minute particles of water are coalesced and separated.

In the breaking of certain crude oil emulsions, it may be desirable to add certain chemicals to the oil in order to change surface tension conditions and such chemicals may be passed into the oil before contact as, for instance, through pump 45 and mixer 46.

Another modification is shown in Fig. 4 in which the cold wet oil from storage 52 is picked up by pump 53 and passed through heat exchanger 54 in which it receives heat from the treated oil and then flows through a heater 55, receiving steam from supply pipe 56 to acquire the desired temperature of say 200° F. and goes thence through line 57 to the bottom of a contact tower 58.

Tower 58 includes a lower contact and coalescing section 59 filled to its discharge level with a concentrated brine solution of say about 23% salinity and containing similarly disclosed contact material 60 supported on perforated plate 61 and having a discharge section 62 closed by a perforated screen 63 surmounted by a baffle 64.

The liquids discharged from section 62 flow into a zone of low velocity 65 the bottom of which consists of a launder, to permit separation of saline water by gravity which is continuously withdrawn in any well known manner through pipe 66 to maintain a desired constant level of water in launder 65.

The oil flowing upwardly through zone 65, in which separation of the bulk of the water takes place, flows into an upper coalescing section 67 through a pipe 68, surounded by a downflow pipe 69 into which it is directed downwardly by a baffle 70, thence through a plurality of perforated radial distributing arms 71 at the bottom of similarly described contact material 72. Section 67 has a discharge neck 73 closed by a perforated screen 74 surmounted by a baffle 75.

Section 67 is primarily filled with a concentrated brine solution of say about 23% salinity to the level of discharge from neck 73 through which the liquids flow to launder 76 in which, due to decreased velocity of flow the remaining water is separated by gravity from the oil, the oil passing through line 78, heat exchanger 54 and cooler 79 to storage.

Manholes 80, 81, 82 and 83 are provided for filling and emptying sections 59 and 67 with contact material.

The modification of Fig. 4 has two especial advantages. The first is that when the water contained in the oil has a low degree of salinity so as to reduce the concentration of the contained body of saline water in lower section 59 below an efficient concentraiton, such lowered concentration may be increased by introducing a more highly concentrated saline solution from the upper coalescing section 67 while maintaining a highly concentrated solution in section 67.

This is accomplished by passing a concentrated saline solution of say about 23% to 25% salinity through pipe 84 into pipe 69 to be deflected by baffle 70 and flow concurrently with the partially dehydrated oil into section 67. In this manner, suspended particles of water of relatively low salinity are mixed with the more concentrated introduced saline solution by coalescence between the particles of the contact material in section 67 immersed in the continually supplied concentrated saline solution, so that substantially complete final separation is assured in launder 76 of section 67.

The relatively highly concentrated saline solution thus separated is run through line 77 to mix with the cold wet crude oil passing from storage 52 to pump 53 whereby, when the water in the crude oil is of low salinity tending to dilute the saline concentration maintained in section 59, the saline percentage in section 59 is raised with increased efficiency in that section.

The second advantage is the saving of salt which may be done, for instance, by running the saline solutions from launders 65 and 75 through pipes 66 and 77, respectively, to one or more evaporating pans 85 and 86 equipped with steam coils 87 and 88 to which steam may be supplied through line 89 from heater 55 and live steam, if required, may additionally be added through line 90.

The saline solution, evaporated to a desired degree of salinity, passes from evaporating pans 85 and 86 through line 91 to pump 92 which forces it through line 84 into section 76, as described, the relatively high heat of the concentrated solution tending to maintain the desired coalescing temperature in section 76.

In this manner, the loss of salt is avoided and heat losses reduced so as to maintain continuous cyclic operation with low costs in the dehydration of oils.

If desired, chemical compounds assisting in the dehydration may be supplied through pipe 93 or 94.

The process may operate under any desired degree of superatmospheric pressure, depending on the character of the emulsion and the operating temperatures.

The preferred salinity of the body of saline solution containing a zone of contact material may range from about 10% to 25% salinity and in general should be greater than the salinity of the contained water in the oil, although if such salinity of the entering water is sufficient to insure coalescence, the salinity need not be increased.

Simple laboratory trials will determine the required salinity, but in all cases the emulsion will be passed through a body of water of some degree of salinity while in the presence of the contact material.

I claim as my invention:

1. The process of treating a mixture of oil and water which comprises: maintaining a body of a saline solution of sodium chloride containing a zone of finely divided contact material, flowing a stream of undissociated emulsified oil and saline water through said body to effect coalescence of said water with said solution, and separating the coalesced water after passage through said zone; said saline solution being of the same character as and of a higher concentration than said water.

2. The process of treating a mixture of oil and water which comprises: maintaining a body of a saline solution of sodium chloride containing a zone of finely divided contact material, flowing a stream of undissociated emulsified oil and saline water through said body to effect coalescence of said water with said solution, maintaining the salinity of said solution by adding thereto similar salt solution of higher concentration, and separating the coalesced water after passage through said zone.

3. The process of treating a mixture of oil and water which comprises: maintaining a body of a saline solution of sodium chloride at about 10% to 25% salinity and containing a zone of finely divided contact material, flowing a stream of undissociated emulsified oil and saline water through said body to effect coalescence of said water with said solution, and separating the coalesced water after passage through said zone; said saline solution being of the same character as and of a higher concentration than said water.

4. The process of treating a mixture of oil and water which comprises: maintaining a body of a saline solution of sodium chloride at about 10% to 25% salinity and containing a zone of finely divided contact material, flowing a stream of undissociated emulsified oil and saline water heated to a temperature in excess of 150° F. but below 212° F. through said body to effect coalescence of said water with said solution, and separating the coalesced water after passage through said zone; said saline solution being of the same character as and of a higher concentration than said water.

5. The process of treating a mixture of water and oil which comprises: maintaining a plurality of bodies of a saline solution of sodium chloride of different degrees of salinity and each containing a zone of finely divided contact material, flowing a stream of undissociated emulsified oil and water heated to a temperature in excess of 150° F. but below the boiling point of the water serially through said bodies, separating out coalesced water and solution after passage through each of said zones, and maintaining the salinity of the first body by returning the separated solution from a succeeding body to said first body; said first body being of a higher saline concentration than the water originally present in said mixture.

SUMNER E. CAMPBELL.